United States Patent [19]

Norris

[11] Patent Number: 4,663,198

[45] Date of Patent: May 5, 1987

[54] FABRIC CONDITIONING ARTICLES FOR USE IN LAUNDRY DRYERS

[75] Inventor: Russell Norris, Cincinnati, Ohio

[73] Assignee: The Procter & Gamble Company, Cincinnati, Ohio

[21] Appl. No.: 171,072

[22] Filed: Jul. 22, 1980

Related U.S. Application Data

[60] Division of Ser. No. 906,807, May 17, 1978, which is a continuation-in-part of Ser. No. 895,335, Apr. 11, 1978, abandoned.

[51] Int. Cl.⁴ .......................... B05D 1/36; B05D 3/00; B05D 5/00; B32B 3/00

[52] U.S. Cl. .................................... 427/264; 427/278; 427/288; 427/398.1; 428/195; 428/211; 428/220

[58] Field of Search ............ 427/264, 278, 288, 398.1; 428/195, 211, 220

[56] References Cited

U.S. PATENT DOCUMENTS

| | | | |
|---|---|---|---|
| 2,665,528 | 1/1954 | Sternfield et al. | 51/185 |
| 3,895,128 | 7/1975 | Gaiser | 428/43 |
| 4,022,938 | 5/1977 | Zaki et al. | 427/242 |
| 4,113,630 | 9/1978 | Hagner et al. | 252/8.6 |
| 4,229,475 | 10/1980 | Barrett et al. | 428/196 |
| 4,291,072 | 9/1981 | Barrett et al. | 427/243 |
| 4,308,306 | 12/1981 | Stahli | 428/141 |

FOREIGN PATENT DOCUMENTS

| | | | |
|---|---|---|---|
| 855362 | 6/1977 | Belgium | 428/195 |

OTHER PUBLICATIONS

Booth, "Coating Equipment and Processes", Lockwood Pub. Co., N.Y., 1970, pp. 149–153 and 157.

*Primary Examiner*—Michael R. Lusignan
*Attorney, Agent, or Firm*—Ronald L. Hemingway; Richard C. Witte

[57] ABSTRACT

Fabric conditioning articles for use in treating fabrics in a laundry dryer. The articles comprise a flexible substrate and a fabric conditioning composition, wherein the fabric conditioning composition is distributed unevenly on the substrate so as to form a visual contrast between areas containing relatively high amounts of conditioning composition and areas containing either no conditioning composition or relatively low amounts thereof.

6 Claims, 6 Drawing Figures

FABRIC CONDITIONING ARTICLES FOR USE IN LAUNDRY DRYERS

CROSS-REFERENCE TO RELATED APPLICATION

This is a division of application Ser. No. 906,807 filed May 17, 1978, which is a continuation-in-part of Ser. No. 895,335 filed Apr. 11, 1978, now abandoned.

BACKGROUND OF THE INVENTION

The present invention relates to articles for conditioning fabrics in an automatic clothes dryer wherein the article comprises a flexible substrate which carries a fabric softening/antistatic agent (hereinafter "fabric conditioning agent").

The employment of such fabric conditioning articles to impart softening and antistatic effects to fabrics in a laundry dryer has been described in the art. For example, U.S. Pat. No. 3,442,692 to Gaiser, issued May 6, 1969, describes the conditioning of fabrics in a laundry dryer by cotumbling the fabrics with a flexible substrate carrying a conditioning agent. The conditioning agent is transferred to the tumbling fabrics to provide fabric conditioning which otherwise might only inconveniently be effected by treatment, for example, during the rinsing cycle of a laundering operation. Similarly, U.S. Pat. No. 3,686,025 to Morton, issued Aug. 22, 1972, describes an article for conditioning fabrics in a laundry dryer. The article comprises an absorptive substrate impregnated with a fabric softening agent for the provision of fabric softening effects with minimal staining tendencies.

In the articles described in the above prior art and in those which are presently available in the market, the fabric conditioning agent is distributed uniformly on the substrate. As a result, it is difficult, when visually examining a used article, to determine if the article has been previously used to condition fabrics in a dryer, i.e., the article has a uniform appearance prior to use, and after any given period of use in the dryer it still has a uniform appearance.

It is an object of the present invention to provide fabric conditioning articles for dryer use which indicate by their appearance whether or not they have been previously used.

DETAILED DESCRIPTION OF THE INVENTION

According to the present invention, dryer-added fabric conditioning articles are provided comprising a flexible web substrate and a fabric conditioning composition wherein the fabric conditioning composition is disposed upon the substrate unevenly so as to provide an article having areas which are visually contrasted from each other. Preferably, these areas of visual contrast form a pattern. In the course of usage the degree of contrast diminishes as the conditioning composition is depleted from the substrate. This difference in appearance from that of the original article provides a means of visually distinguishing articles which have been used from those which have not.

In one embodiment, an article of the invention comprises a flexible woven or nonwoven web substrate in a sheet form having disposed thereon a fabric conditioning composition, wherein the fabric conditioning composition is unevenly distributed on the substrate in areas of high concentration of fabric conditioning composition per unit area of substrate and areas of low concentration of fabric conditioning composition per unit area of substrate so as to produce visual contrast between said high concentration and low concentration areas, wherein the weight per unit area of composition in the high concentration areas is at least about 2 times (preferably from about 3 to about 10 times) the weight per unit area of composition in the low concentration areas, and wherein the total weight ratio of fabric conditioning composition to substrate is from about 0.5:1 to about 5:1.

In another, and more preferred embodiment, a pigment is incorporated into the portion of the fabric conditioning composition which forms the areas of high concentration of fabric conditioning composition on the substrate, thus enhancing the degree of achievable visual contrast between the high concentration and low concentration areas, and also making possible the achievement of a given level of visual contrast between areas of high concentration and low concentration with a smaller difference in concentrations between these areas than is possible when no pigment is used. Such preferred embodiment can be described as an article comprising a woven or nonwoven web substrate in a sheet form having disposed thereon a fabric conditioning composition, wherein the fabric conditioning composition is unevenly distributed on the substrate in areas of high concentration of fabric conditioning composition per unit area of substrate and areas of low concentration of fabric conditioning composition per unit area of substrate so as to produce a visual contrast between said high concentration and low concentration areas, wherein the portion of the fabric conditioning composition in the areas of high concentration contains from about 0.05% to about 10% (preferably from about 0.1% to about 4%), based on total weight of fabric conditioning composition in said areas of high concentration, of a pigment which causes the portion of fabric conditioning composition in the areas of high concentration to differ in color from the portion of the fabric conditioning composition in the areas of low concentration, wherein the weight per unit area of composition in the high concentration areas is at least about 1.25 times (preferably from about 1.4 to about 3.0 times, and most preferably from about 1.4 to about 2.0 times) the weight per unit area of composition in the low concentration areas, and wherein the total weight ratio of fabric conditioning composition to substrate is from about 0.5:1 to about 5:1.

In a method embodiment, the present invention also comprises a method of manufacturing dryer-added fabric conditioning articles in sheet form wherein said articles comprise a flexible woven or nonwoven web substrate having a fabric conditioning agent disposed unevenly on said substrate so as to produce a visual contrast between areas of high concentration of fabric conditioning composition and areas of low concentration of fabric conditioning composition, said process comprising the steps of:

A. applying a first portion of fabric conditioning composition, in a melted state, uniformly to the obverse face of said substrate;
B. cooling the substrate so as to solidify the said composition;
C. passing the cooled substrate through the nip formed by the impression roll and the printing roll of a rotary printing station, said station comprising:

(i) an impression roll, (ii) a rotogravure printing roll having recessed areas in its face in the shape of a pattern which it is desired to print onto the substrate, (iii) a means for feeding melted fabric conditioning composition to said rotogravure roll, and (iv) a means (such as a doctor blade) for scraping melted fabric conditioning composition from the face of said rotogravure roll, but leaving fabric conditioning composition in the recessed areas of the face of said roll, thereby printing onto a portion of the area of said substrate a second portion of fabric conditioning composition in a pattern corresponding to the recessed areas of said rotogravure roll, the respective amounts of fabric conditioning composition applied to the substrate in steps A and C being such as to provide a total composition to substrate ratio of from about 0.5:1 to 5:1 and to provide a concentration of fabric conditioning composition per unit area of substrate on the portion of the substrate defined by the pattern, which is at least 1.25 times the concentration of fabric conditioning composition per unit area on the portion of the substrate not defined by the pattern, and D. cooling the substrate so as to solidify the fabric conditioning composition.

It will be useful at this point to define certain terms and concepts used throughout this specification in describing the present invention.

"Fabric conditioning agent" shall mean an organic substance which is capable of imparting a fabric softening or antistatic effect to fabrics.

"Fabric conditioning composition" shall mean a composition comprising one or more fabric conditioning agents.

"Substrate" shall mean a woven or nonwoven web structure in a sheet configuration.

"Obverse face" shall mean the face of the substrate to which the fabric conditioning composition is applied in manufacturing articles of the invention.

"Reverse face" shall mean the face of the substrate which is on the reverse side of the substrate from the obverse face.

"Area" shall mean a space defined by dimensions on the obverse face of the substrate and shall include the entire thickness of the substrate under the said space. (The term "under" is used with reference to the substrate lying horizontally, with the obverse face facing upward.) Thus, for example, a nonwoven web substrate which is 25 cm. wide, 25 cm. long and 0.01 cm. thick has a total area of 625 sq. cm. for purposes of describing the present invention.

It is to be understood that substrates used in the articles of the invention can be relatively porous and absorbent. Thus, with respect to a given portion of the space on the obverse face of a substrate occupied by a fabric conditioning composition, some of the composition, because of impregnation into and through the porous, absorbent structure, can reside within the substrate and on the reverse face of the substrate under the given portion. Thus, within the context of the present invention, the amount of fabric conditioning composition "disposed on" a portion of the area of the substrate, includes the amount which resides on the surface space of the obverse face, defined by the dimensions of that portion, as well as that amount which resides within the substrate and on the reverse face of the substrate directly under the obverse face dimensions of that portion. Consider, for example, a square porous nonwoven web substrate which has an obverse face dimension of 25 cm. by 25 cm. and is 0.01 cm. thick. A 15 cm. diameter circle (177 sq. cm.), having its center at the center of the obverse face of the substrate is marked off on the obverse face. 2 grams of melted fabric conditioning composition are applied (e.g., by rotogravure printing as described hereinafter) to the portion of the obverse face defined by the circle. Because of the porous nature of the substrate, some of the composition penetrates into the substrate and through the substrate to the reverse face, opposite the circle on the obverse face. Since the circle occupies 28.3% (177 sq. cm. $\div$ 625 sq. cm. $\times$ 100%) of the substrate area (as defined above), 100% of the fabric conditioning composition is disposed upon 28.3% of the area of the substrate. The weight per unit area of composition in the high concentration area is about 0.011 g./sq. cm., and in the low concentration area it is 0 g. per sq. cm. The weight ratio of composition per unit area in the high concentration area to the low concentration area is, therefore, infinity.

If in the foregoing example, 50% of the 2 grams of fabric conditioning composition (i.e., 1.0 g.) is applied uniformly to the entire area of the obverse face of the substrate, followed by application of the remaining 50% (i.e., 1.0 g.) to the portion of the obverse face defined by the circle, then 64.1% of the fabric conditioning composition $$\frac{[(1.0 \text{ g.} \times .283) + 1.0 \text{ g.}] \times 100\%}{2 \text{ g.}}$$

is disposed upon 28.3% of the substrate area. In this case, the weight per unit area of composition in the high concentration area is 0.0072 g./sq. cm., and the weight per unit area of composition in the low concentration area is 0.0016 g. per sq. cm. The weight ratio of composition per unit area in the high concentration area to the low concentration area is 4.5:1.

In the articles of the invention, the areas of high concentration of fabric conditioning composition will generally occupy from about 5% to about 60% of the total substrate area while the remaining portion of the total substrate area consists of the areas of low concentration of fabric conditioning composition. Preferably the high concentration areas occupy from about 15% to about 50% (most preferably from about 25% to about 45%) of the total substrate area, the remainder of the total substrate area consisting of areas of low concentration of fabric conditioning composition.

Although articles of the invention can have all of the fabric conditioning composition disposed in the areas of high concentration (i.e., the "low concentration" areas contain no fabric conditioning composition), it is preferred that fabric conditioning composition be present in both the high concentration and low concentration areas.

The uneven distribution of fabric conditioning composition onto the substrate in areas of high concentration and low concentration is desirably in the form of a pattern which is aesthetically pleasing and/or informative to the user of the article. Thus by printing techniques such as rotogravure printing, or rotary screen printing, the uneven distribution of fabric conditioning composition can be used to form decorative patterns such as geometric designs, flowers, lace, bells, clouds, etc., or it can be used to form words such as the product brand name.

FABRIC CONDITIONING COMPOSITIONS

Figure 1A:
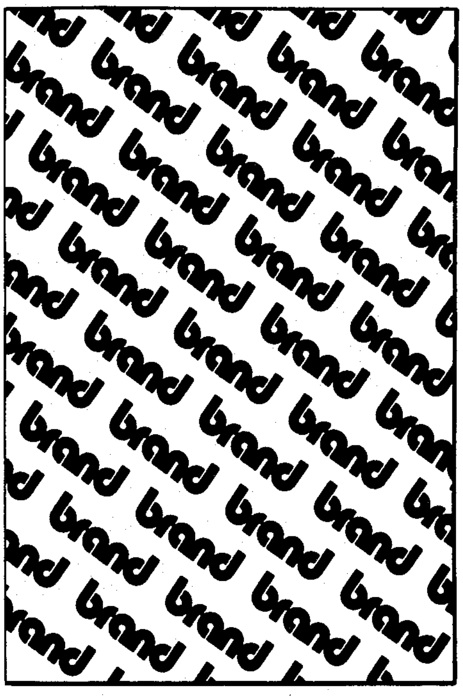
FIG. 1A shows an article of the invention prior to use. The areas of high concentration of fabric conditioning composition have been printed onto the substrate in the form of letters to form the word "brand.
Figure 1B:
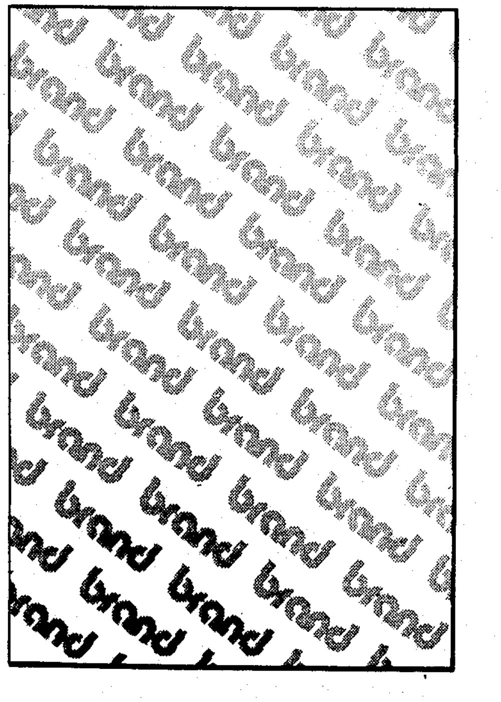
" FIG. 1B depicts the appearance of the article as the visual pattern begins to disappear during use in the dryer.
Figure 1C:
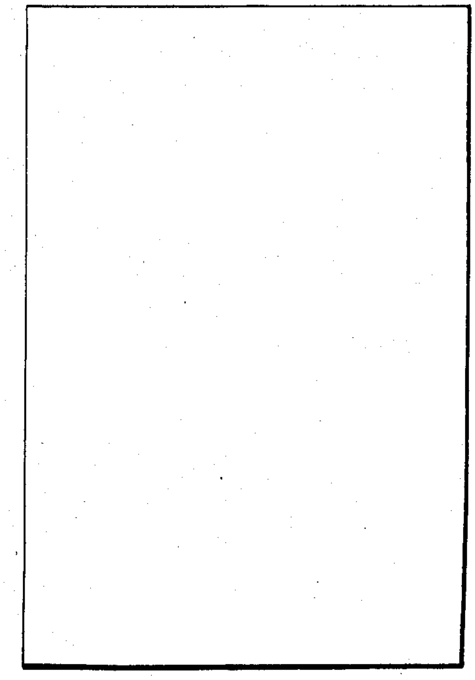
FIG. 1C depicts the appearance of the article after the visual pattern has completely disappeared.

The fabric conditioning compositions utilized in the articles of the present invention can comprise any of the fabric softening and/or antistatic agents (i.e., fabric conditioning agents) conventionally used in dryer-added fabric softening articles. The agents can be utilized individually or in mixtures.

Such softening/antistatic agents are organic compounds having at least one relatively long hydrocarbon group serving to provide lubricity and/or antistatic effects. Among such groups are alkyl groups containing 8 or more carbon atoms and preferably from 12 to 22 carbon atoms. Suitable fabric conditioning agents include cationic, anionic, nonionic, or zwitterionic compounds. Cationic fabric conditioning agents are the preferred fabric conditioning agents for use herein. They include the cationic nitrogen-containing compounds such as quaternary ammonium compounds which have one or two straight-chain organic groups of at least eight carbon atoms. Preferably, they have one or two such groups of from 12 to 22 carbon atoms. Preferred cation-active softener compounds include the quaternary ammonium softener compounds corresponding to the formula

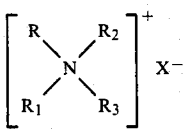

wherein R is hydrogen or an aliphatic group of from 12 to 22 carbons; $R_1$ is an aliphatic group having from 12 to 22 carbon atoms; $R_2$ and $R_3$ are each alkyl groups of from 1 to 3 carbon atoms; and X is an anion selected from halogen, acetate phosphate, nitrite and methyl sulfate radicals. The methyl sulfate radical is the preferred anion.

Because of their excellent softening efficacy and ready availability, preferred cationic softener compounds of the invention are the dialkyl dimethylammonium salts (particularly the methylsulfate salts), wherein the alkyl groups have from 12 to 22 carbon atoms. The alkyl groups are usually derived from long-chain fatty acids, such as hydrogenated tallow fatty acids. As employed herein, alkyl is intended to include unsaturated compounds such as are present in aliphatic groups derived from naturally occurring fatty oils. The term "tallow" refers to fatty alkyl groups derived from tallow fatty acids. Such fatty acids give rise to quaternary softener compounds wherein R and $R_1$ have predominantly from 16 to 18 carbon atoms. The term "coconut" refers to fatty acid groups from coconut oil fatty acids. The coconut-alkyl R and $R_1$ groups have from about 8 to about 18 carbon atoms and predominate in $C_{12}$ to $C_{14}$ alkyl groups. Representative examples of quaternary softeners of the invention include tallow trimethyl ammonium methylsulfate; ditallow dimethyl ammonium methylsulfate; dihexadecyl dimethyl ammonium chloride; di(hydrogenated tallow) dimethyl ammonium methylsulfate; dioctadecyl dimethyl ammonium methylsulfate; dieicosyl dimethyl ammonium methylsulfate; didocosyl dimethyl ammonium methylsulfate; di(hydrogenated tallow) diethyl ammonium methylsulfate; dihexadecyl diethyl ammonium methylsulfate; dihexadecyl diethyl ammonium methylsulfate; dihexadecyl dimethyl ammonium acetate; ditallow dipropyl ammonium phosphate; ditallow dimethyl ammonium nitrate; di(coconut-alkyl) dimethyl ammonium chloride.

Other suitable cation-active softener compounds herein are the quaternary imidazolinium salts. Preferred salts are those conforming to the formula

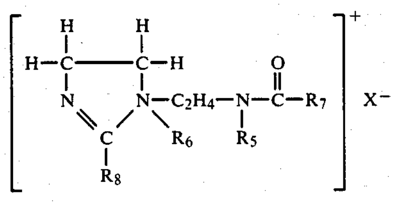

wherein $R_6$ is an alkyl containing from 1 to 4, preferably from 1 to 2, carbon atoms, $R_7$ is an alkyl containing from 1 to 4 carbon atoms or a hydrogen radical, $R_8$ is an alkyl containing from 8 to 22, preferably at least 15, carbon atoms, $R_5$ is hydrogen or an alkyl containing from 8 to 22, preferably at least 15, carbon atoms, and X is an anion, preferably methylsulfate. Other suitable anions include those disclosed with reference to the cationic quaternary ammonium fabric softeners described hereinbefore. Particularly preferred are those imidazolinium compounds in which both $R_5$ and $R_8$ are alkyls of from 12 to 22 carbon atoms, e.g., 2-heptadecyl-1,1-methyl [(2-stearolyamido)ethyl] imidazolinium methylsulfate.

Other cationic quaternary ammonium fabric softeners, which are useful herein include, for example, alkyl ($C_{12}$ to $C_{22}$)-pyridinium methylsulfates, alkyl ($C_{12}$ to $C_{22}$)-alkyl ($C_1$ to $C_3$)-morpholinium methylsulfates, and quaternary derivatives of amino acids and amino esters.

The anionic fabric conditioning agents can include any of the various surface-active anionic fabric-softening and antistatic agents such as alkali metal or ammonium salts of higher fatty alcohol sulfates, higher fatty alcohol ether sulfates, higher fatty alcohol sulfonates, the linear higher alkyl benzene sulfonates, the higher fatty acyl taurides and isethionates. Generally, the cation of such compounds will be an alkali metal or other water-solubilizing radical. The hydrophobic moiety of such compounds will normally contain from 10 to 22 carbon atoms. Alkali metal and ammonium soaps of fatty acids of from 10 to 22 carbon atoms can also be employed and include the sodium or potassium coconut or tallow soaps.

Suitable nonionic fabric conditioning agents that can be employed are the polyoxyalkylene glycols, the higher fatty alcohol esters of polyoxyalkylene glycols, the higher fatty alcohol ethers of polyoxyalkylene glycols. Also suitable are the ethoxylates of long-chain alcohols of from 8 to 22 carbon atoms such as the ethoxylates of tallow alcohol with, for example, 10 to 40 moles of ethylene oxide. Other nonionics include the amides such as the alkanolamides, e.g., the higher fatty amides and higher fatty acid mono- and di-lower alkanolamides, wherein the long-chain hydrophobic groups have from about 10 to 22 carbon atoms.

A particularly useful class of nonionic fabric conditioning agents are the fatty acid esters of sorbitan and ethoxylates of such esters, which melt and flow over a range of about 38° C. to 68° C.. These materials, as well as cationic fabric conditioning agents, are described more fully in U.S. Pat. No. 4,022,938 to Zaki et al., issued May 10, 1977, and incorporated herein by reference. Examples of suitable sorbitan esters are sorbitan tristearate, sorbitan dipalmitate, sorbitan monolaurate and sorbitan monostearate, as well as mixtures of sorbitan esters such as mixtures of mono-, di- and tristearate esters of sorbitan. Particularly preferred fabric conditioning compositions for use in the articles herein contain from about 15% to about 85% (preferably from about 20% to about 80%) by weight of a cationic fabric conditioning agent such as ditallowdimethylammonium methylsulfate and from about 85% to about 15% (preferably from about 80% to about 20%) of a $C_{10}$ to $C_{26}$ fatty acid ester of sorbitan, such as sorbitan monostearate. All composition percentages herein are "by weight" unless specified otherwise.

Other suitable softening agents include the zwitterionic compounds of the formula $$R_9-\underset{\displaystyle R_{11}}{\overset{\displaystyle R_{10}}{\overset{|}{\underset{|}{N^{\oplus}}}}}-CH_2-R_{12}-CH_2SO_3^-$$

wherein $R_{10}$ and $R_{11}$ are each methyl, ethyl, n-propyl, isopropyl, 2-hydroxyethyl or 2-hydroxypropyl, $R_9$ is a 12 to 22 carbon atom alkyl or alkenyl and wherein said alkyl or alkenyl contains from 0 to 2 hydroxyl substituents, from 0 to 5 ether linkages, and from 0 to 1 amide linkage, and $R_{12}$ is an alkylene group containing from 1 to 4 carbon atoms with from 0 to 1 hydroxyl substituents; particularly preferred are compounds wherein $R_9$ is a carbon chain containing from 14 to 18 carbon atoms selected from the group consisting of alkyls wherein said alkyls contain 0 to 2 hydroxyl substituents. Specific examples of the particularly preferred compounds of this class include the following: 3-(N-hexadecyl-N,N-dimethylammonio)-2-hydroxypropane-1-sulfonate; and 3-(N-octadecyl-N,N-dimethylammonio)-propane-1-sulfonate.

Other examples of conditioning agents suitable for the articles herein are described in detail in U.S. Pat. No. 3,686,025 at column 5, line 51, to column 14, line 6, which disclosure is incorporated herein by reference.

The fabric conditioning compositions will generally comprise a mixture of fabric conditioning agents in order to obtain the optimum balance of conditioning performance. Cationic fabric conditioning agents generally comprise at least about 10% by weight of such mixtures, preferably about 20%. Generally, however, cationic agents are not used in mixtures with anionic agents because of chemical interaction.

The amount of fabric conditioning composition which is applied to the substrate to fabricate an article of the present invention is an amount sufficient to provide the desired conditioning effect without substantial excess. Generally, the amount used is sufficient to provide a conditioning agent:substrate weight ratio of from about 0.5:1 to about 5:1, preferably from about 1:1 to about 3:1.

The fabric conditioning compositions herein comprise from about 85% to 100% fabric conditioning agent.

In addition to fabric conditioning agents the conditioning composition can contain additives such as pigments, perfumes, mothproofing agents, mildewproofing agents, fabric brighteners, viscosity modifiers, such as clays and gums, etc.

Pigments are particularly useful additives for the fabric conditioning compositions of the invention. In a preferred aspect of the invention, the portion of fabric conditioning composition which is disposed upon the areas of high concentration of fabric conditioning composition in the articles of the invention contains from about 0.05% to about 10% preferably from about 0.1% to about 7%) by weight of a pigment. The percent of pigment is based upon the total weight of fabric conditioning composition (i.e., pigment plus other composition components) disposed upon the areas of high concentration of fabric conditioning composition. The pigment present in the portion of composition which is disposed upon the high concentration areas accentuates the visual difference between the high concentration and low concentration areas. In the absence of pigments, the fabric conditioning compositions herein are generally translucent and have a grayish or yellowish color in their solid state.

Any particulate material having a particle size from about 6 to about 100 microns, which is inert to the other components of the fabric conditioning composition and which is insoluble in the melted composition is suitable for use as a pigment herein. The pigment is incorporated into the composition by blending it into a molten mixture of the other composition components. Examples of suitable pigments are titanium dioxide, calcium carbonate, calcium sulfate, magnesium oxide, clay, ultramarine blue, phthalocyanine blue, monastral fast blue, permanent peacock blue, monastral fast green and pigment green B.

THE SUBSTRATE

The substrate component of the article of the present invention is a woven or nonwoven flexible web substrate which carries the fabric conditioning agent. Such substrates include paper (e.g., paper towelling), woven or nonwoven cloth made from natural or synthetic fibers, and foamed plastic materials such as polyurethane foamed sheets. The use of flexible webs as substrates for carrying fabric conditioning agents for dryer use is described in U.S. Pat. Nos. 3,442,692, Gaiser, issued May 6, 1969; 3,895,128, Gaiser, issued July 15, 1975; and 3,686,025, Morton, issued August 22, 1972, both incorporated herein by reference. Numerous examples of flexible web substrates are disclosed in these references.

In order to obtain a good appearance in the fabric conditioning articles herein, and to obtain even release of the fabric conditioning composition to the clothes in the dryer, it is preferable that the web substrate be absorbent. "Absorbent" as defined herein, is intended to mean a substrate with an absorbent capacity (i.e., a parameter representing a substrate's ability to take up and retain water) of from 4 to 25. Suitable paper and woven and nonwoven cloth absorbent substrates are disclosed in U.S. Pat. No. 3,686,025, issued Aug. 22, 1972 to Morton, and incorporated by reference herein. As described in that patent, determination of absorbent capacity values is made by using the capacity testing procedures described in U.S. Federal Specifications UU-T-595b, (incorporated by reference herein), modified as follows:

(1) tap water is used instead of distilled water;
(2) The specimen is immersed for 30 seconds instead of 3 minutes;
(3) draining time is 15 seconds instead of 1 minute; and
(4) the specimen is immediately weighed on a torsion balance having a pan with turned-up edges.

Absorbent capacity values are then calculated in accordance with the formula given in said Specification. Based on this test, one-ply, dense bleached paper (e.g., kraft or bond having a basis weight of about 7.9 kg. per 100 square meters) has an absorbent capacity of 3.5 to 4. Commercially available household one-ply toweling paper has a value of 5 to 6; and commercially available two-ply household toweling paper has a value of 7 to about 9.5.

If the substrate to be used is paper or a woven or nonwoven cloth, rather than a foamed plastic material, the absorbency should preferably be in the range of 4 to 12, most preferably between 5 and 7. For foamed plastic materials, such as foamed polyurethane, the preferable absorbency is in the range of about 15 to 22.

The thickness of the substrates used herein can range from about 0.005 cm. to about 0.5 cm. Generally, paper and woven or nonwoven cloth substrates will have thicknesses of from about 0.005 cm. to abour 0.02 cm. and the foamed plastic substrates will have thicknesses of from about 0.05 cm. to about 0.5 cm.

The preferred substrates for use in the present invention are nonwoven cloth substrates, which can generally be defined as adhesively bonded fibrous or filamentous products having a web or carded fiber structure (where the fiber strength is suitable to allow carding), or comprising fibrous mats in which the fibers or filaments are distributed haphazardly or in random array (i.e., an array of fibers in a carded web wherein partial orientation of the fibers is frequently present, as well as a completely haphazard distributional orientation), or substantially aligned. The fibers or filaments can be natural (e.g., wool, silk, jute, hemp, cotton, linen, sisal, or ramie) or synthetic (e.g., rayon, cellulose ester, polyvinyl derivatives, polyolefins, polyamides, or polyesters).

Methods of making nonwoven cloths are not a part of this invention and, being well-known in the art, are not described in detail herein. Generally, however, such cloths are made by air- or water-laying processes in which the fibers or filaments are first cut to desired lengths from long strands, passed into a water or air stream, and then deposited onto a screen through which the fiber-laden air or water is passed. The deposited fibers or filaments are then adhesively bonded together, dried, cured, and otherwise treated as desired to form the nonwoven cloth. Nonwoven cloths made of polyesters, polyamides, vinyl resins, and other thermoplastic fibers can be spun-bonded, i.e., the fibers are spun out onto a flat surface and bonded (melted) together by heat or by chemical reactions.

The absorbent properties preferred herein are particularly easy to obtain with nonwoven cloths and are provided merely by building up the thickness of the cloth, i.e., by superimposing a plurality of carded webs or mats to a thickness adequate to obtain the necessary absorbent properties, or by allowing a sufficient thickness of the fibers to deposit on the screen. Any diameter or denier of the fiber (generally up to about 10 denier) can be used, inasmuch as it is the free space between each fiber that makes the cloth porous and is directly related to the absorbent capacity of the cloth.

The choice of binder-resins used in the manufacture of nonwoven cloths can provide substrates possessing a variety of desirable traits. For example, the absorbent capacity of the cloth can be increased, decreased or regulated by respectively using a hydrophilic binder-resin, a hydrophobic binder-resin, or a mixture thereof, in the fiber bonding step. Moreover, the hydrophobic binder-resin, when used singly or as the predominant compound of a hydrophobic-hydrophilic mixture, provides nonwoven cloths which are especially useful as substrates when the softening articles herein are used with damp fabrics in an automatic dryer.

When the substrate for the softening articles herein is a nonwoven cloth made from fibers deposited haphazardly or in random array on the screen, the articles exhibit excellent strength in all directions and are not prone to tear or separate when used in the automatic clothes dryer.

Preferably, the nonwoven cloth is water-laid or air-laid and is made from cellulosic fibers, particularly from regenerated cellulose or rayon. Such nonwoven cloth can be lubricated with any standard textile lubricant. Preferably, the fibers are from 0.45 cm. to 5 cm. in length and are from 1.5 to 5 denier. Preferably, the fibers are at least partially oriented haphazardly, particularly substantially haphazardly, and are adhesively bonded together with a hydrophobic or substantially hydrophobic binder-resin, particularly with a nonionic self-crosslinking acrylic polymer or polymers. Preferably, the cloth comprises about 70% fiber and 30% binder-resin polymer by weight and has a basis weight of from about 17 to 29 grams per square meter. It is preferred that the fabric softening articles of the present invention be structured to have maximum compatibility with conventional laundry dryer designs. While it is preferred to employ the articles of the present invention in an automatic laundry dryer, other equivalent machines can be employed, and in some instances, heat and drying air may be omitted for part or all of the cycle. Generally, however, heated air will be employed and such air will be circulated frequently in the dryer. Normally, there are from about 5 to 50 volume changes of drying air in the dryer drum per minute and the air moves at about 3.5 to 5 cubic meters per minute. These changing volumes of air create a drawing or suction effect which can, especially with small fabric loads, cause an item such as a sock, handkerchief, or the like, or a fabric conditioning article, to be disposed on the surface of the air outlet of the dryer. A usual load of fabrics of from about 5 to 7 pounds dry weight will fill from about 10% to 70% of the volume of most dryers and will normally pose little difficulty.

A sufficient number of tumbling items will normally be present to prevent any item from being drawn to the exhaust outlet or to cause it to be removed from the outlet. In the event, however, a fabric softening article is caused to be disposed in relation to the air exhaust outlet in such a manner as to cause blockage of passing air, undesirable temperature increases can result. In the case of fabric conditioning articles, the fabric conditioning compositions substantially melt under conditions of heat, and the article may tend to adhere to an exhaust outlet.

The problem of blockage can be solved by providing openings in the article in the manner described in U.S. Pat. Nos. 3,944,694, McQueary, issued Mar. 16, 1976; and 3,956,556, McQueary, issued May 11, 1976, both incorporated herein by reference. More specifically, slits or holes are cut through the substrate to allow free passage of air.

The slit openings are provided for two principal purposes. Importantly, the slits permit passage of air in the event the article is placed in a blocking relationship to the air exhaust outlet. Moreover, the slit openings provide a degree of flexibility or resiliency which causes the article to crumple or pucker. The effect of such crumpling is that only a portion of the air exhaust outlet will be covered by the softening article in the event it is carried by the moving air stream to the exhaust outlet. Moreover, the crumpled article is more readily removed by tumbling fabrics than would be the case if the article were placed in a flat relationship to the exhaust outlet.

The type and number of slit openings can vary considerably and will depend upon the nature of the substrate material, its inherent flexibility or rigidity, the nature of the fabric conditioning composition, and the extent to which increased passage of air therethrough is desired. The preferred articles of this invention can comprise a large number of small slits of various types or configurations, or fewer larger slits. For example, a single rectilinear or wavy slit, or a plurality thereof, confined to within the area of a sheet and extending close to opposite edges of the article, can be employed. By maintaining a border around all edges of the article, a desired degree of flexibility and surface area availability to tumbling fabrics can be maintained. While, for example, rectilinear slits can be cut into a softening article completely to the edges of the article, confinement of the slits to within the area of the article will be preferred where the convenience of packaging the softening article in roll form is desired, i.e., the article will better maintain its structural integrity when being handled by the user.

According to one preferred embodiment of the invention, a sheet of fabric softening article is provided with a plurality of rectilinear slits extending in one direction, e.g., the machine direction of the web substrate, and in a substantially parallel relationship. The slits can be aligned or in a staggered relationship. A preferred embodiment will contain from 5 to 9 of such slits which will extend to within about 5 cm. and preferably 2.5 cm. from the edge of the web material which is, for example, a 22.9 cm. by 27.9 cm. sheet. In general, the greater the number and the longer the slits, the greater the effect in preventing restriction of air flow. Such an article permits the individual panel areas or sections within the rectilinear slits to flex or move in independent relationship to each other and out of the plane of the sheet. This flexing minimizes the probability that such an article will align itself in a flat and blocking relationship to an exhaust outlet. The inherent puckering or crumpling tendency of the article allows the article to contact the air outlet in such a manner as to leave at least a portion of the air exhaust outlet uncovered. In addition, the tumbling fabrics in the dryer will collide with the crumpled article causing it to be removed from the exhaust outlet. Removal is readily accomplished by reason of the protrusion of the crumpled article which makes it more available for contact with the tumbling load of fabrics in the dryer.

The slit openings in the softening articles of the invention can be in a variety of configurations and sizes, as can be readily appreciated. In some instances, it may be desirable to provide slit openings as C-, U- or V-shaped slits. Such slits arranged in a continuous or regular or irregular pattern are desirable from the standpoint of permitting gate-like or flap structures which permit the passage of air therethrough.

ARTICLE MANUFACTURE

The articles of the present invention are manufactured by melting the fabric conditioning composition, distributing it onto portions of the obverse face of the substrate to produce the desired visual pattern, and then cooling to solidify the fabric conitioning composition. A preferred embodiment is one wherein a portion (generally from about 20% to about 80% by weight) of the total amount of fabric conditioning composition which is applied to the substrate is evenly disposed onto the entire obverse face of the substrate, and then cooled to solidify this portion of composition, before the remaining 80% to 20% by weight of fabric conditioning composition is disposed onto particular areas of the obverse face to produce areas of high concentration of fabric conditioning composition and thereby producing the desired areas of visual contrast. The portions of composition applied in the two steps can be portions of the same composition or they can be portions of two different compositions. Preferably, the portion of the fabric conditioning composition which is evenly disposed onto the substrate is free of pigment and the portion which is disposed onto particular areas to produce areas of high concentrations, contains a sufficient amount of pigment to produce a pigment concentration of from about 0.05% to about 10% (preferably from about 0.1% to about 7%), by weight of pigment, based on the total amount of fabric conditioning composition disposed upon the areas of high concentration. The "total amount of fabric conditioning composition" in the areas of high concentration includes the originally unpigmented composition which was originally disposed onto those areas, as well as the pigmented composition which has been added.

In the articles of the invention the weight ratio of total fabric conditioning composition to substrate should be within the range of from about 0.5:1 to 5:1, and is preferably from about 1:1 to about 3:1, with the fabric conditioning composition being disposed unevenly on the substrate so as to form the desired visual contrast effect between areas of high concentration and low concentration. As indicated hereinbefore, the uneven disposition of fabric conditioning composition is desirably in the form of a pattern which is aesthetically pleasing and/or informative to the user.

Figure 2:
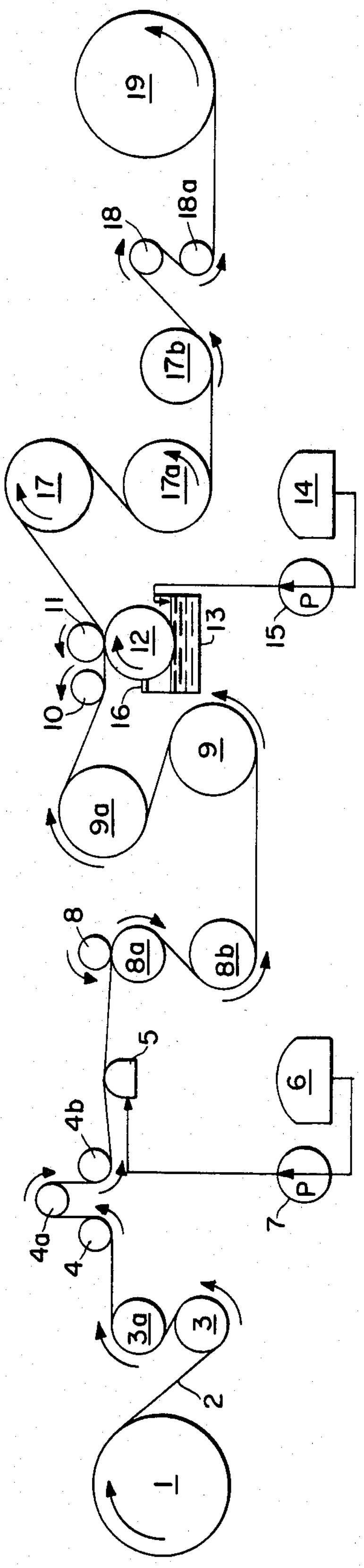
FIG. 2 is a schematic diagram depicting a means of manufacturing articles of the invention by rotogravure printing, and will be described in more detail hereinafter.

A convenient means of manufacturing articles of the invention is by rotogravure printing. FIG. 2 presents a schematic description of how articles of the invention can be made by such a process.

The substrate 2 from unwind roll 1 is drawn over heated metal rollers 3 and 3*a* which are maintained at a temperature of from about 38° C. to 80° C. The substrate is then drawn over idler rollers 4, 4*a* and 4*b* and over coating head 5, which is a closed container with a narrow slit opening at the top. The slit is aligned perpendicular to the direction of movement of the substrate and has a length equal to the width of the substrate. Molten fabric conditioning composition (maintained as a temperature of about 10° C. to about 40° C. above the melting point of the composition) from reservoir 6 is pumped by pump 7 into coating head 5 so as to maintain a positive pressure (140 to 1400 g./sq. cm.) of molten conditioning composition against substrate 2 through the slit of coating head 5, thereby applying a uniform treatment of fabric conditioning composition to the obverse face of substrate 2. (Pressures quoted herein are gauge pressures unless specified otherwise.) Substrate 2 is then drawn between the nip of distribution rolls 8 and 8*a* and over distribution roll 8*b*, which are all maintained at a temperature of from about 55° C. to about 80° C. The function of the distribution rolls is to distribute the composition evenly throughout the thickness of the substrate. The pressure between the nip of distribution rolls 8 and 8*a* is maintained at a gauge pressure of about 2500 to 15,000 g. per linear cm. Substrate 2 is then drawn over cooling rolls 9 and 9*a* which are maintained at a temperature of about 1° C. to about 25° C., to solidify the fabric conditioning composition applied by coating head 5. Substrate 2 is then drawn under idler roll 10 and between nip of impression roll 11 and rotogravure roll 12, which picks up molten fabric conditioning composition from print pan 13, which is supplied with fabric conditioning composition from reservoir 14 via pump 15. The fabric conditioning composition in the print pan is maintained at a temperature of at least 10° C. (preferably about 10° C. to about 40° C.) above the melting point of the composition. Rotogravure roll 12 contains recesses in its surface face which are in the pattern which it is desired to print on substrate 2. The recesses are from about 0.009 cm. to about 0.030 cm. deep with reference to the surface face of the roll. Preferably the recesses consist of a plurality of individual cells, with a density of from about 60 to about 600 cells per sq. cm. of recessed area. After pickup of fabric conditioning composition from print pan 13, rotogravure roll 12 contacts doctor blade 16 which scrapes excess fabric conditioning composition off the surface face of rotogravure roll 12, leaving fabric conditioning composition in the recesses of said roll. Rotogravure roll 12 comes into contact with substrate 2 which is pressed between impression roll 11 and rotogravue roll 12. The pressure exerted by impression roll 11 (preferably from about 2500 to 15,000 g. per linear cm.) causes fabric conditioning composition to be transferred from the recesses of rotogravure roll 12 to the obverse face of substrate 2 thus imprinting the desired pattern of composition onto the substrate. Substrate 2 is then drawn over cooling rolls 17, 17*a* and 17*b*, which are maintained at a temperature of from about 1° C. to about 25° C. so as to solidify the composition on substrate 2. Finally, substrate 2 passes over idler rolls 18 and 18*a* and is wound onto rewind roll 19. Heated rolls 3 and 3*a*, coating head 5, reservoir 6, pump 7, distribution rolls 8, 8*a* and 8*b* and chill rolls 9 and 9*a* can be deleted from the process if it is not desired to treat the obverse face of the substrate with fabric conditioning composition prior to applying the patterned design from rotogravure roll 12.

Figure 3:
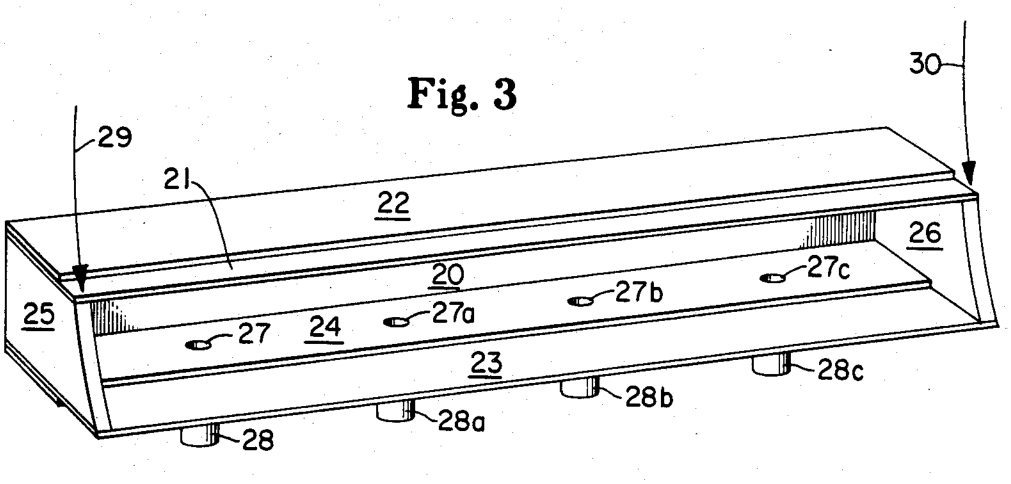
FIG. 3 is a drawing of a pressurized applicator head which can be used to apply fabric conditioning composition to a rotogravure printing roll, and will be described in more detail hereinafter.

FIG. 3 depicts an alternate means to the open print pan for applying melted fabric conditioning composition to the rotogravure roll. This means is a pressurized applicator head which fits against the rotogravure roll and feeds fabric conditioning composition, under pressure to the roll. The head comprises a back wall 20, a top wall, which is comprised of doctor blade 21 and doctor blade retainer 22, a bottom wall which is comprised of doctor blade 23 and doctor blade retainer 24, and side walls 25 and 26. Doctor blade retainer 24 contains feed ports 27, 27*a*, 27*b* and 27*c* through which melted fabric conditioning composition is pumped into the applicator head through feed lines 28, 28*a*, 28*b* and 28*c* from a reservoir (not shown). When used, the open front face of the applicator defined by doctor blades 21 and 23 and the curved edges of side walls 25 and 26 is engaged against the surface of the rotogravure roll. The applicator head is filled with melted fabric conditioning composition which is maintained at a pressure of from about 140 to 2000 g. per sq. cm. As the rotogravure roll rotates in the direction of arrows 29 and 30, it picks up fabric conditioning composition from within the applicator head. As the rotogravure roll rotates past doctor blade 23, the doctor blade scrapes excess fabric conditioning composition off the surface of the surface face of the roll, leaving fabric conditioning composition in the recesses of the roll.

Figure 4:
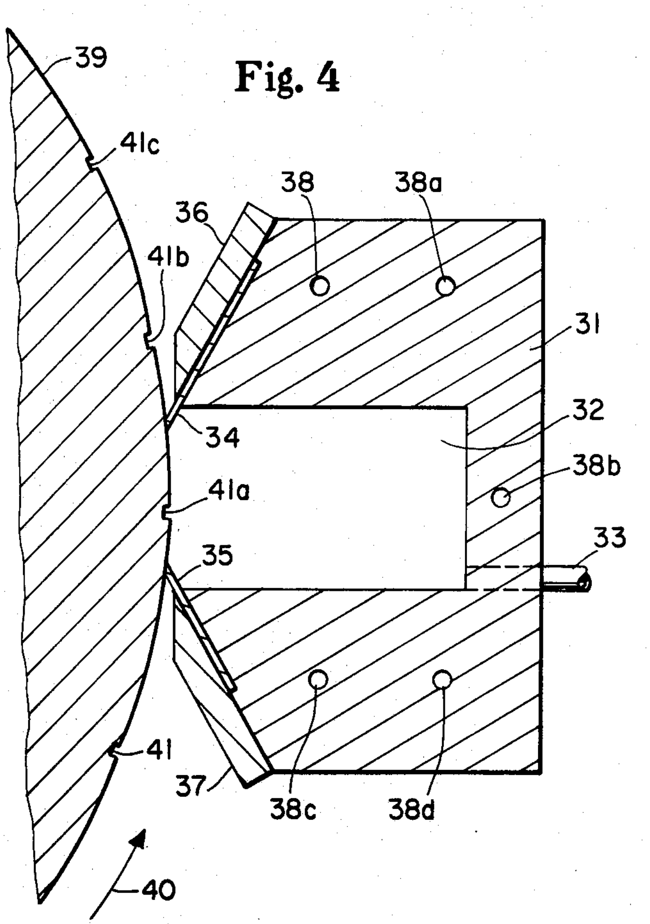
FIG. 4 is a drawing of a vertical cross-section of a pressurized applicator head which is a variation of the type of applicator head shown in FIG. 3, and will be described in more detail hereinafter.

FIG. 4 depicts a vertical cross-section of a pressurized applicator head, which is a variation of the type depicted in FIG. 3, in contact with a rotogravure roll 39.

The applicator head comprises a metal casing 31, which encloses a chamber 32, on three sides, a plurality of inlet ports, one of which is depicted and designated 33, an upper doctor blade 34, a lower doctor blade 35, an upper doctor blade retainer 36, a lower doctor blade retainer 37, and a plurality of threaded holes 38, 38*a*, 38*b*, 38*c*, and 38*d* by which end walls (not shown) are fastened to the ends of the casing. A leakproof seal between the end walls and the casing is achieved by use of a Viton ® quad ring gasket. The ends of the doctor blades are in movable sealed contact with the end walls which are made of Teflon ®. This seal is achieved by the compression of the blade against the Teflon ®. In use, the chamber of the applicator head is filled with melted fabric conditioning composition and maintained at a pressure (about 140 to 2000 g. per sq. cm.) by the pumping of melted fabric conditioning composition into the chamber via the inlet ports. The opposing forces exerted against the doctor blades by the fluid pressure of the composition in the chamber and by the rotogravure roll 39, retain the blades in very tight contact against the rotogravure roll. As the roll rotates in the direction of arrow 40, it picks up fabric conditioning composition from within the applicator head. As the roll rotates past doctor blade 34, the doctor blade scrapes excess conditioning composition off the surface face of the roll, leaving fabric conditioning composition in the recesses of the roll 41, 41*a*, 41*b*, and 41*c*.

The temperature of heated and cooled rolls in the process can be maintained by circulating refrigerated or heated liquid through the interior of the rolls.

The finished article material on rewind roll 19 can be subsequently unwound and cut into individual sheets for packaging and sale. Instead of individual sheets, the finished material can be cut into lengths with perforated tear lines at predetermined intervals perpendicular to the length direction. These lengths can be placed on individual rolls and packaged so that the user can tear off individual sheets of appropriate size at the time of use.

If it is desired to incorporate slits or other types of openings into the article, this can be done just prior to winding the finished article material onto rewind roll 19, or when it is unwound from said roll for cutting and packaging.

Typically, the individual usage sheets of articles of the invention are designed to provide from about 1 to about 5 grams of fabric conditioning composition per sheet, with the area of the individual sheets being from about 130 sq. cm. to about 970 sq. cm.

The article is used by placing it in the dryer with up to about 5–7 lbs. of fabrics (based on dry weight) and cotumbling the article and the fabrics together during the drying cycle.

The invention is illustrated by the following example.

EXAMPLE I

An article of the invention is made according to the process in FIG. 2.

The substrate is a nonwoven cloth made of rayon fibers having an average length of about 4 cm. and a denier of about 3. The fibers are bound together by an ethyl acrylate binder system, the binder comprising about 30% to about 35% by weight of the substrate. The substrate thickness is 0.008 cm. and the substrate weight is 21 grams per square meter. The substrate has an absorbent capacity of 6 grams of water per gram of substrate.

The portion of fabric conditioning composition which is applied uniformly to the obverse face of the substrate by coating head 5 consists of 70% by weight sorbitan monostearate (SMS) and 30% by weight ditallowdimethylammonium methylsulfate (DTDMAMS), and is applied to the substrate in an amount so as to produce composition:substrate ratio of 0.97:1. The portion of composition which is applied by the rotogravure roll is prepared by mixing 100 parts of the above SMS/DTDMAMS composition in a molten state with 11 parts titanium dioxide and 1 part of Bentolite L clay (a montmorillonite clay purchased from Southern Clay Products) to form a composition consisting of 26.8% by weight DTDMAMS, 62.6% by weight SMS, 9.8% by weight titanium dioxide, and 0.8% clay. The clay thickens the mixture and also provides pigmentation. This pigmented portion of composition is printed onto the substrate (to which the unpigmented composition has already bcen uniformly applied) in a decorative "clouds" design produced by the recesses in the surface face of the rotogravure roll. The printed-on design covers 36% of the substrate area and the amount of pigmented composition which is added by the print-on, raises the total fabric conditioning composition:substrate ratio to 1.5:1, and the weight percent of pigment (titanium dioxide plus clay) present in the total amount of fabric conditioning composition present on the substrate area defined by the printed design is 6.4%.

In preparing the article according to the process of FIG. 2, metal rollers 3 and 3*a* are maintained at a temperature of about 70° C., the compositions in coating head 5 and print pan 13 are maintained at a temperature of about 65° C. The pressure in the coating head is maintained at about 350 g./sq. cm. The distribution rolls 8, 8*a* and 8*b* are maintained at a temperature of about 70° C. and the cooling rolls 9 and 9*a* are maintained at a temperature of about 13° C. The recesses in the rotogravure roll 12 are cellular, having a depth of about 0.02 cm. and a density of about 140 cells per sq. cm. of recessed area. The temperature of rotogravure roll 12 and impression roll 11 is maintained at about 80° C. Cooling rolls 17, 17*a* and 17*b* are maintained at about 1° C.

After cooling and rewinding, the printed substrate is cut into individual 22.9 cm. by 27.9 cm. rectangular articles. A series of six 12.7 cm. slits, approximately 2.5 cm. apart, are cut into the articles in the lengthwise direction, the series of slits being centered within the article (see U.S. Pat. No. 3,944,694). The articles each contain about 2.1 grams of fabric conditioning composition, and the composition:substrate ratio is about 1.5:1. In these articles, 58% by weight of the fabric conditioning composition is disposed upon 36% of the substrate, and 42% by weight of the fabric conditioning composition is disposed upon the remaining 64% of the substrate area.

One of these articles is placed into an automatic laundry dryer with five pounds (dry weight basis) of damp clothes. The dryer is operated for 45 minutes at the normal heat setting. The fabrics and article are then removed from the dryer and it is observed that the pattern has disappeared from the article. The fabrics are softer and exhibit less static cling than fabrics which have been dried in a similar manner without adding a fabric conditioning article to the dryer. Depending upon conditions of usage, the pattern on the article may not always completely disappear during use. In any event, however, the pattern will exhibit a substantially different appearance after usage than before usage, thereby providing an easy means of distinguishing a used article from one which has not been used.

What is claimed is:

1. A method of manufacturing dryer-added fabric conditioning articles in sheet form wherein said articles comprise a flexible woven or nonwoven web substrate having a fabric conditioning agent disposed unevenly on said substrate so as to produce a visual contrast between areas of relatively high concentration of fabric conditioning composition and areas of relatively low concentration of fabric conditioning composition, said process comprising the steps of:

A. applying a first portion of fabric conditioning composition, in a melted state, uniformly to the obverse face of said substrate;

B. cooling the substrate so as to solidify the said composition;

C. passing the cooled substrate through the nip formed by the impression roll and the printing roll of a rotary printing station, said station comprising:
   (i) an impression roll,
   (ii) a rotogravure printing roll having recessed areas in its face in the shape of a pattern which it is desired to print onto the substrate,
   (iii) a means for feeding melted fabric conditioning composition to said rotogravure roll, and
   (iv) means for scraping melted fabric conditioning composition from the face of said rotogravure roll, but leaving fabric conditioning composition in the recessed areas of the face of said roll, thereby printing onto a portion of the area of the obverse face of said substrate a second portion of fabric conditioning composition in a pattern corresponding to the recessed areas of said rotogravure roll, the respective amounts of fabric conditioning composition applied to the substrate in steps A and C being such as to provide a total composition to substrate ratio of from about 0.5:1 to 5:1 and to provide a concentration of fabric conditioning composition per unit area of substrate on the portion of the substrate defined by the pattern which is at least 1.25 times the concentration of fabric conditioning composition per unit area on the portion of the substrate not defined by the pattern, the said second portion of fabric conditioning composition containing a pigment in sufficient quantity such that the concentration of pigment in the total amount of fabric conditioning composition in the area defined by the pattern is from about 0.05% to about 10%; and D. cooling the substrate so as to solidify the fabric conditioning composition.

2. The process of claim 1 wherein from about 20% to about 80% of the total amount of fabric conditioning composition is applied to the substrate in Step A, and from about 80% to about 20% of the total amount of fabric conditioning composition is printed onto the substrate in Step C.

3. The process of claim 2 wherein the recessed areas in the face of the rotogravure printing roll consist of a plurality of individual cells, the density of said cells in said recesses being from about 60 to about 600 cells per sq. cm. of recessed area.

4. The process of claim 3 wherein the substrate is selected from the group consisting of woven or nonwoven cloth and has an absorbent capacity of from about 4 to about 12 and a thickness of from about 0.005 cm. to about 0.02 cm.

5. The process of claim 4, wherein the fabric conditioning composition comprises from 15% to about 85% by weight of a cationic fabric conditioning agent which is a methylsulfate salt and from 85% to about 15% by weight of a $C_{10}$ to $C_{26}$ fatty acid ester of sorbitan.

6. The process of claim 2 wherein the concentration of pigment in the total amount of fabric conditioning composition in the area defined by the pattern is from about 0.1% to about 7%.

* * * * *